(12) United States Patent
Danish et al.

(10) Patent No.: US 6,863,858 B2
(45) Date of Patent: Mar. 8, 2005

(54) WINDSHIELD WIPER MOTOR WITH MOLDED SLEEVE AND THRUST ELEMENTS

(75) Inventors: Peter J. Danish, Scottsville, NY (US); Frank R. Lombardo, Rochester, NY (US); Gary S. Andrews, Henneth, NY (US); David M. Williams, Pavilion, NY (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 148 days.

(21) Appl. No.: 10/264,247

(22) Filed: Oct. 3, 2002

(65) Prior Publication Data

US 2003/0024102 A1 Feb. 6, 2003

Related U.S. Application Data

(62) Division of application No. 09/467,530, filed on Dec. 20, 1999.

(51) Int. Cl.$^7$ .............................................. B29C 45/14
(52) U.S. Cl. .................... 264/250; 264/272.19
(58) Field of Search ...................... 264/272.19, 272.2, 264/250, 251; 29/596; 310/90

(56) References Cited

U.S. PATENT DOCUMENTS

| | | | |
|---|---|---|---|
| 4,321,748 A | * | 3/1982 | Ito .............................. 29/596 |
| 5,144,738 A | | 9/1992 | Oyafuso |
| 5,218,256 A | | 6/1993 | Umezawa et al. |
| 5,268,607 A | | 12/1993 | McManus |
| 5,399,025 A | * | 3/1995 | Higuchi et al. ............. 384/428 |
| 5,485,044 A | | 1/1996 | Mackay et al. |
| 5,770,907 A | | 6/1998 | Danish et al. |

OTHER PUBLICATIONS

Rosato et al., Injection Molding Handbook, second edition, International Thompson Publishing, pp. 257–261.*

* cited by examiner

Primary Examiner—Jill L. Heitbrink
(74) Attorney, Agent, or Firm—Young & Basile, P.C.

(57) ABSTRACT

A method and apparatus for forming and mounting a sleeve and a thrust member in a bore in a motor/gear drive housing shaft to support the motor/gear drive shaft against radial and axial movement. Gates are formed in the motor/gear drive housing and communicate with separate first and second bores in the housing. A mold core is inserted into the housing and closes off one bore to allow the injection of molten plastic into a cavity formed between the tip end portion of the mold core and the first bore to form an annular sleeve. The annular sleeve has an inner diameter larger than the outer diameter of the end tip portion of the motor/gear drive shaft to be nominally spaced from the outer diameter of the drive shaft, but is supportingly engaged by the drive shaft under radial deformation of the drive shaft. Insertion of the drive shaft into the housing causes the tip end portion of the drive shaft to sealing close the second bore in the housing allowing the injection of molten plastic into the second bore to form a thrust member axially engaged with the end of the drive shaft to resist axial movement of the drive shaft during operation.

24 Claims, 3 Drawing Sheets

WINDSHIELD WIPER MOTOR WITH MOLDED SLEEVE AND THRUST ELEMENTS

CROSS-REFERENCE TO CO-PENDING APPLICATION

This application is a divisional application of co-pending U.S. patent application Ser. No. 09/467,530, filed Dec. 20, 1999.

FIELD OF THE INVENTION

The present invention relates, in general, to motor and gearbox drives and, more specifically, to motor and gearbox drives with right-angled gearboxes and, even more specifically, to motor and gearbox drives for vehicle windshield wipers.

BACKGROUND OF THE INVENTION

Electric motors having gear reduction are widely employed for many industrial applications. Typically, the gear reduction is provided by a gear train formed of at least two meshing gear members, one of which is driven by the motor output shaft and may be actually incorporated into the structure of the motor output shaft, and the second fixed on an axle or shaft thereby rotating the shaft upon rotation of the motor output shaft.

In a typical application of such a motor/gearbox drive, windshield arms and blades are attached to a conventional linkage which includes a crank arm fixedly mounted on the rotatable output shaft of a motor/gear drive. Within the motor/gearbox housing, a worm gear is formed on the motor output shaft. One end of the shaft is rotatably mounted in a bore formed in the housing. An intermediate end of the shaft is also supported in a bearing mounted in the housing.

Cost reduction in the motor/gearbox drive has focused on the worm gear shaft and related components. Cost reduction can be achieved in this area by using a smaller diameter worm gear shaft. However, without support at the end of the shaft, the gear train fails at less than the required torque output. Such failure is a result of excessive deflection of the worm gear shaft. To control the deflection of the shaft, a bearing surface is required at the end of the shaft. A thrust bearing surface is also required to control axial movement of the shaft. One solution is to machine a bore in the housing, which then receives a press-in bearing. However, the location of the machined bore cannot be held to the necessary tolerance for proper location of the bearing-to-shaft journal. Proper location of this journal is essential for low noise and high efficiency of the motor/gearbox drive. If the bearing is more than a few thousandths of an inch out of position, excessive noise and friction result.

Axial end play of the gear shaft must also be controlled by minimizing such axial movement in order to prevent noise. It is known to provide a drilled and tapped bore in the housing axially in line with the worm gear shaft, which bore receives a threaded screw carrying a molded elastomer or resilient end cap. The screw is threaded into the tapped bore a sufficient distance to bring the end cap into engagement with the shaft. While this minimizes axial movement of the shaft to a certain extent, such an arrangement introduces other problems, the most significant of which is the drilled bore which forms a new water path entry into the motor/gearbox housing. In addition, the end cap applies force to the shaft and thereby controls the gear meshing.

Another solution to the radial and axial movement problems associated with a smaller diameter worm gear shaft is to provide another bearing in the gearbox housing to support the end of the shaft. However, this introduces an added cost into the motor gearbox drive.

Thus, it would be desirable to provide a motor/gearbox drive having molded sleeve and thrust elements or bearing surfaces which enable a smaller than normal diameter output drive shaft to be employed while still preventing excess radial deflection and excess axial movement of the drive shaft. It would also be desirable to provide such thrust and sleeve elements which minimize noise during operation of the motor/gear drive. It would also be desirable to provide sleeve and thrust bearing surfaces for a motor gear drive which can be easily integrated with existing motor/gearbox production methods for low manufacturing costs.

SUMMARY OF THE INVENTION

The present invention is a unique method and apparatus for providing a sleeve and a thrust member in a motor/gearbox housing to support the motor/gear drive shaft against radial and axial loads.

The apparatus includes a motor/gear drive arrangement where a motor drive shaft has a worm gear carried thereon and a tip end terminating in an end wall, and a bore is formed in a gearbox housing coaxial with the output shaft.

In one aspect, the invention comprises an improvement including an annular sleeve concentrically disposed about the tip end portion of the output shaft and nominally spaced from the tip end portion. The tip end portion of the drive shaft, under radial loads acting on the drive shaft, engages the sleeve, with the sleeve limiting further radial movement or deflection of the drive shaft.

In another aspect of the invention, an injection molded thrust member is disposed in the bore in the housing in coaxial registry with the end wall of the shaft. The engagement of the thrust member with the end wall of the output shaft prevents axial movement of the drive shaft.

According to one aspect of the invention, at least one and preferably each of the sleeve and the thrust member are formed by injection molding. More specifically, the sleeve and tubular member are each injection molded within the housing during the assembly of the motor/gear drive.

The sleeve preferably has an inner diameter which is nominally larger than the outer diameter of the tip end portion of the drive shaft such that the tip end portion of the drive shaft nominally rotates within the bore in the sleeve during normal operation of the drive shaft.

Another aspect of the present invention defines a unique method of manufacturing a motor/gear drive wherein the motor has a drive shaft carrying a worm gear, and a tip end portion terminating in an end wall, the method comprising:

forming a bore in a housing surrounding the motor/gear drive, the bore having a first bore portion of a first diameter; and forming a sleeve having a through bore in the first bore portion of the housing.

The sleeve is preferably formed by the steps:

forming a shoulder between the first bore portion and a second bore portion;

forming a first gate in the housing communicating with the first bore portion; and inserting a mold core into the housing, the mold core having a first end portion with a diameter larger than the outer diameter of the tip end portion of the drive shaft and a second larger diameter portion having a shoulder formed between the first and second portions sealingly closing the first bore portion, the first bore portion and the tip end portion of the mold core forming an interior cavity;

injecting molten plastic into the interior cavity through the first gate to form the sleeve having an inner diameter surface surrounding a bore; and removing the mold core.

The method also includes forming a shoulder on the mold core which is engagable with a bearing mounting surface in the housing to concentrically align the mold core with the first and second bore portions in the housing to concentrically align the sleeve with the first bore portion.

In yet another aspect, a first flange is formed on the housing and is engaged with a mating flange formed on the mold core. Engagement of the two flanges aligns the later formed sleeve concentrically about a longitudinal axis of the drive shaft when the drive shaft is engaged with the sleeve.

In yet another aspect of the present invention, the method further comprises the steps of:

forming a second gate in the housing communicating with the second bore portion;

forming an end wall of the drive shaft with an outer diameter larger than the diameter of the second bore portion;

disposing the end wall of the drive shaft to sealingly close off an end of the second bore portion;

inserting the drive shaft of the motor/gear drive into the housing with the tip end portion of the drive shaft extending through the first bore portion;

disposing the end wall of the drive shaft to sealing close the second bore portion; and injecting molten plastic through the second gate into the second bore portion to form a thrust member in the second bore portion in registry with the end wall of the drive shaft.

The unique thrust member and sleeve of the present invention manufactured by the unique inventive method enables a smaller diameter and therefore a lower cost motor/gear drive shaft carrying a worm gear to be rotatably mounted in a housing and supported against radial and axial movement for reduced noise and friction.

The unique sleeve and thrust member of the present invention also contribute to a reduced manufacturing cost for the motor/gear drive since a costly bearing is not required to support the end portion of the motor/gear drive shaft. Further, the sleeve and thrust member are uniquely formed by an injection molding process utilizing gates formed in the motor/gear drive housing. This reduces assembly steps and part count. In addition, the injection molding of the sleeve and the thrust member can be integrated into an existing motor/gear drive assembly process for a simplified manufacturing of the motor/gear drive.

The use of separate gates directed to separately closed bore portions in the housing used to form the sleeve and thrust member, respectively, enable different materials to be used to form the sleeve and the thrust member thereby enabling the materials to be engineered to meet the different radial and/or axial loads of the sleeve and the thrust member.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
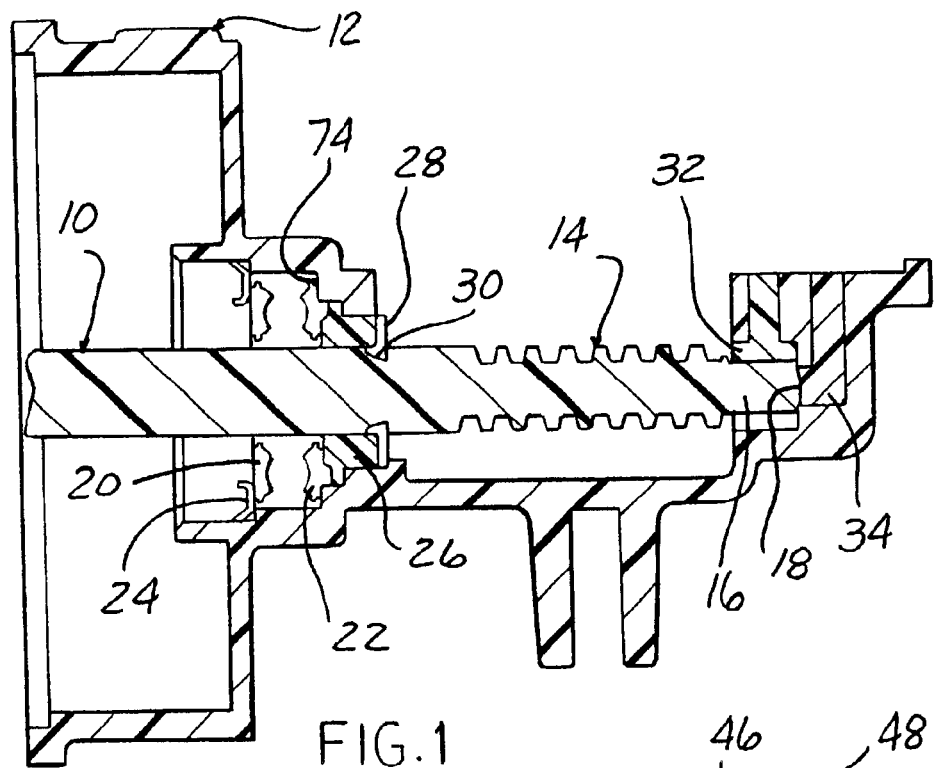
FIG. 1 is a longitudinal cross-sectional view through a gearbox of a motor gear drive having sleeve and thrust bearing surfaces constructed in accordance with the teachings of the present invention and apparatus.

Referring now to the drawing, and to FIG. 1 in particular, there is depicted a portion of a motor/gear drive suitable for use in many different applications. It will be understood that although the following detailed description and the drawing show the inventive features of the motor/gear drive in a windshield wiper drive application, the present invention may also be employed in any motor/gear drive having an angled gearbox and, more preferably, a right-angled gearbox incorporating a gear pair, such as meshing worm and worm gear.

FIG. 1 depicts only the motor shaft 10, with the drive motor itself not being shown. In this application, the motor and gear drive are mounted in two separate housings with a housing 12, which is typically a cast housing, by example only, formed of a suitable metal, such as aluminum, depicted for the gear drive.

The shaft 10 has a generally cylindrical configuration for a portion of its length extending outward from the motor itself. In this application, a helical worm gear 14 is integrally formed in the output shaft 12 by molding or machining. The worm gear 14 is spaced a short distance from a tip end portion 16 of the shaft 10. The tip end portion 16 terminates in an end wall 18.

An intermediate portion of the shaft 10 is supported in the housing 12 by a pair of bearing races 20 and 22. The bearing races 20 and 22 are held in position in the housing 12 by a bearing housing 24 in contact with the inner bearing race 20 and a sleeve 26 and clip 28 which are disposed in engagement with the outer race 22.

The clip 28 seats within an undercut 30 in the shaft to retain the sleeve 26 in position in a intermediate bore formed in the housing 12.

It will be understood that the worm wheel or worm which engages the worm gear 14 and is fixedly mounted on a drive shaft, not shown in FIG. 1, is angularly offset, typically at 90° from the axis of the drive shaft 10.

In order to use a smaller diameter shaft 10 so as to reduce the cost of the motor/gear drive, the tip end portion 16 of the shaft 10 must be supported against radial forces which tend to deflect the drive shaft 10 as well as axial thrust forces tending to move the shaft 10 axially within the housing 12. A unique solution to this problem is provided by the present invention in low cost manner which can also be easily integrated in the assembly process of the motor/gear drive.

According to the present method and apparatus, a unique annular sleeve 32 and a unique thrust member or surface 34 are provided in the housing 12 and positioned to resist radial deflection of the tip end 16 of the shaft 10 as well as axial movement of the shaft 10 under operating thrust loads.

According to one aspect of the present invention, the sleeve 32 is formed as an annular member having an outer diameter and an inner diameter formed to certain dimensions as described hereafter. The sleeve 32 is formed of a suitable material which provides high durability and which minimizes noise when engaged by the shaft 10.

Figure 6:
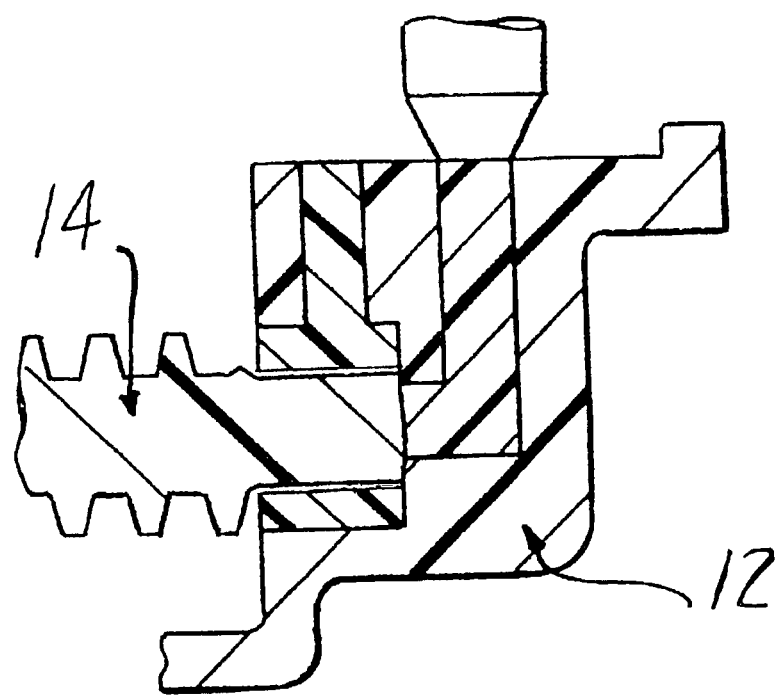
FIG. 6 is a partial, cross-sectional view of the end portion of the gear housing shown in FIGS. 4 and 5, with the gear shaft mounted therein, showing a gap between the end portion and the sleeve.

According to a unique feature of the present invention, the inner diameter of the sleeve 32 is slightly oversized or larger than the outer diameter of the tip end portion 16 of the shaft 10. This provides radial spacing which allows the tip end 16 of the shaft 10 to freely rotate within the sleeve 32 and without contacting the inner diameter surface of the sleeve 32 during normal operation (as best seen in FIG. 6). However, when excessive radial forces are exerted on the shaft 10, the tip end portion 16 of the shaft 10 will flex bringing the outer diameter of the tip end portion 16 into engagement with the inner diameter of the sleeve 32. The sleeve 32 resists further radial movement or deflection of the tip end 16 of the shaft 10 so as to support the shaft and reduce noise and friction during rotation of the shaft 10.

The thrust member 34 is provided in a bore in the housing 12, as described hereafter, coaxially with the shaft 10 and in registry with the end wall 18 of the shaft 10 as shown in FIG. 1. The thrust member 34 engages, but does not load the shaft 10, so as to merely prevent axial movement of the shaft 10 when thrust forces are exerted on the shaft 10 such as forces which occur at the reversal or inwipe and endwipe positions of a windshield wiper arm assembly.

The sleeve 32 and thrust member 34 are formed of suitable plastic materials which can be engineered to optimize the required properties of durability and noise suppression. The materials forming the thrust member 34 and the sleeve 32 may be the same or different as the sleeve 32 and the thrust member 34 serve different functions.

According to another aspect of the present invention, the sleeve 32 and the thrust member 34 are formed according to a unique method which will now be described.

Figure 2:
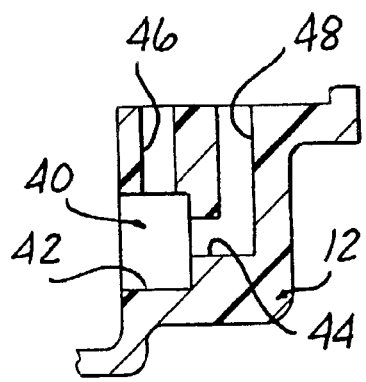
FIG. 2 is a partial, cross-sectional view through one end of the gearbox shown in FIG. 1.

As shown in FIG. 2, the housing 12 has a stepped bore 40 formed of a first larger diameter bore portion 42 and a second, coaxial smaller diameter bore portion 44, with both of the first and second bore portions 42 and 44 referred to hereafter simply as the first bore 42 and the second bore 44. A first gate or runner 46 is formed through the housing 12 and has an outlet disposed in fluid communication with the first bore 42 and an inlet opening externally with respect to the housing 12. The first gate 46 is designed to provide a path for molten plastic, as described hereafter, during an injection molding process to flow into the first bore 42.

The second bore 44 communicates with a second gate or runner 48 which also extends through the housing 12 from an inlet. The second gate or runner 48 provides a flow path for molten plastic during an injection molding process step to the second bore 44 as described hereafter.

Figure 3:
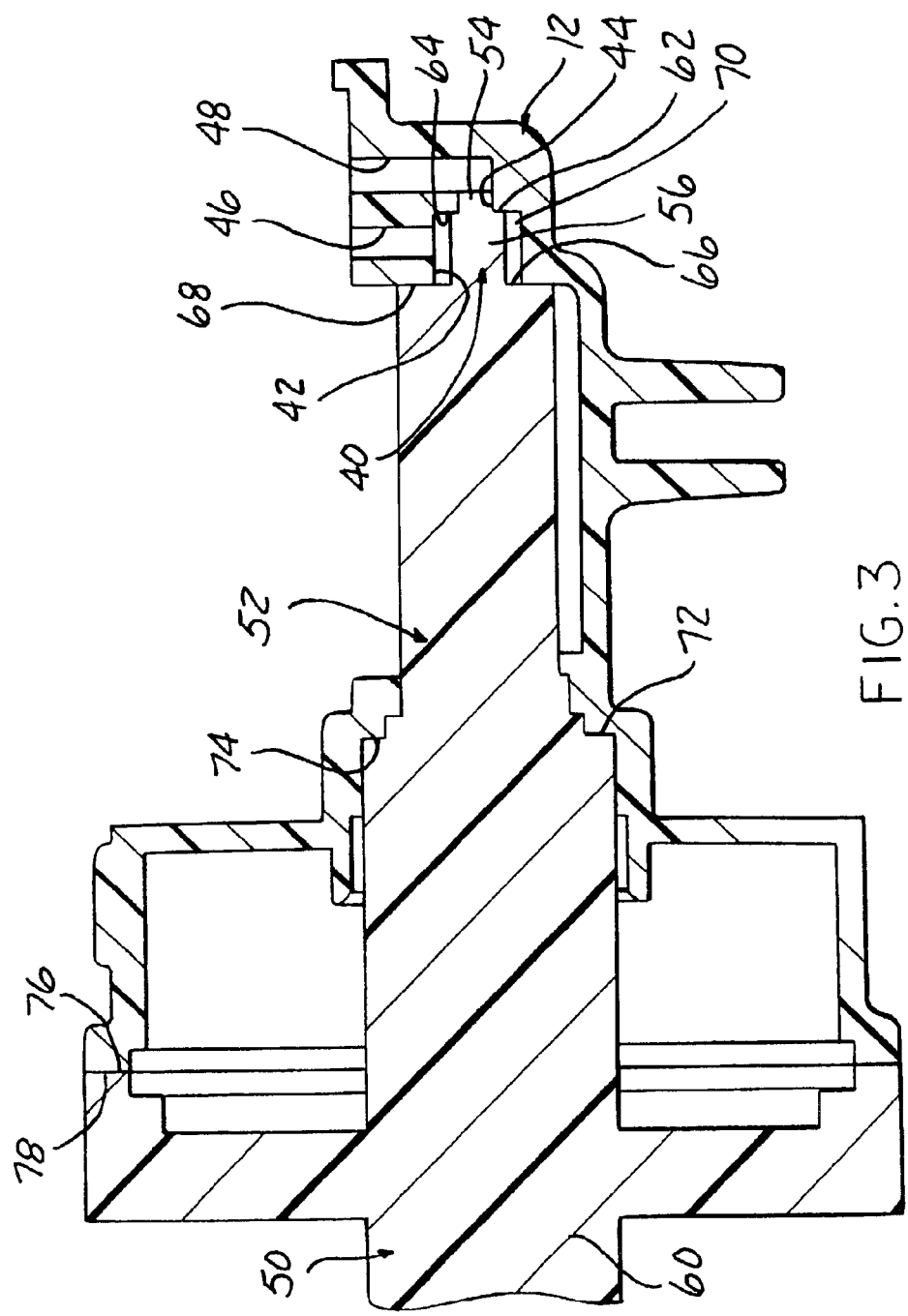
FIG. 3 is an enlarged longitudinal cross-sectional view of a gearbox showing the mounting of a mold core of the present invention in the gearbox shown in FIG. 1.

The present method and apparatus make use of a mold core 50, shown in FIG. 3 which concentrically aligns, seals and forms an interior cavity for forming the sleeve 32 as described hereafter. The mold core 50 includes a shank 52 having a first diameter cylindrical end portion 54, an adjacent second, larger diameter cylindrical portion 56, an adjacent yet larger diameter cylindrical portion, and a final largest diameter portion 60.

The cylindrical portions 54, 56, and 60 serve various functions.

Specifically, the first cylindrical portion 54 of the mold core 50 has an outer diameter just slightly smaller than the inner diameter of the second bore 44 in the housing 12 so as to fit therein. A first shoulder 62 is formed between the coplanar ends of the first and second cylindrical portions 54 and 56 of the mold core 50. The first shoulder 62 is designed to sealingly engage a face 64 formed between the first and second bores 42 and 44 in the housing 12.

Figure 4:
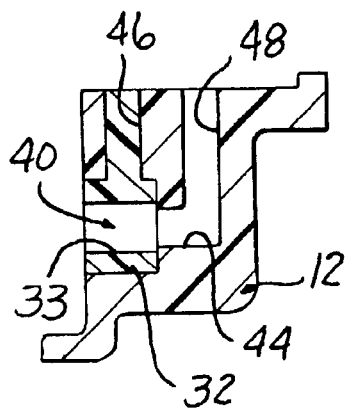
FIG. 4 is a partial, cross-sectional view of the end of the gearbox housing, with the sleeve of the present invention mounted therein.

Similarly, a second shoulder 66 is formed between the ends of the second cylindrical portion 56 and the third cylindrical portion 58 of the mold core 50. The second shoulder 66 is positioned to sealingly engage a second face 68 formed in the housing 12 at the end of the first bore 42 and an enlarged internal cavity formed within the housing 12. The first shoulder 62 and the first face 64 combine with the second shoulder 66 and the second face 68 to sealingly close off and form an interior chamber 70 within the first bore 42 of the housing 12 between the inner surface of the first bore 42 and the outer surface of second cylindrical portion 56 of the mold core 50. The interior cavity 70 is disposed in fluid flow communication with the first gate or runner 46 to enable molten plastic to be injected into the interior cavity 70 to form the sleeve 32 as shown in FIGS. 1 and 4.

It should also be noted that the outer diameter of the second cylindrical portion 56 of the mold core 50 has a larger diameter than the outer diameter of the tip end portion 16 of the shaft 10. This enables the inner diameter of the sleeve 32 formed in the cavity 70 to be larger than the outer diameter of the end tip portion 16 of the shaft 10 so as to be nominally spaced from the tip end portion 16 of the shaft 10.

A third shoulder 72 is formed intermediate along the shank 52 of the mold core 50 and is positioned to engage a third face 74 formed intermediately within the housing 12. The third face 74 is formed as one support wall of the outer bearing race 22 shown in FIG. 1. An enlarged annular flange 78 is formed on the mold core 50 and extends radially outward from an intermediate portion of the shank 52. The annular flange 78 is formed with an outer cylindrical mounting flange 76 which is adapted to engage a similar mounting flange on a portion of the housing 12.

The mating engagement of the various shoulders, flanges and faces on the mold core 50 and the housing 12 cause the first cylindrical portion 54 of the mold core 50 to be coaxially aligned with what will be the position of the motor output shaft 10 to ensure a proper bearing-to-shaft journal which is essential for low noise and high efficiency.

Figure 5:
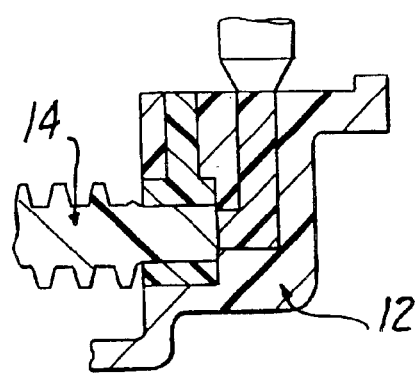
FIG. 5 is a partial, cross-sectional view of the end portion of the gear housing shown in FIG. 4, with the gear shaft mounted therein, prior to the formation of the thrust bearing surface according to the present invention.

After the injected plastic cools to a hardened state forming the sleeve 32, the mold core 50 is removed as shown in FIG. 4. In the next method step of the present invention, the drive shaft 10 extending outward from the motor, not shown, is aligned with the interior bore 33 within the sleeve 32. The tip end portion 16 of the shaft 10 is then inserted into the bore 33 in the sleeve 32 as shown in FIG. 5. The tip end portion 16 seats against the first face 64 closing off the second bore 44 from the first bore 42 containing the sleeve 32. Molten plastic is then injected through the second gate 48 into the first bore 44 to form the thrust member 34, as shown in FIG. 5. The thrust member 34 engages the end wall 18 of the tip end portion 16 of the shaft 10 to hold the shaft 10 from axial movement under any axial forces exerted on the shaft 10 during operation of the motor and gear.

In summary, there has been disclosed a unique method and apparatus for forming and mounting a sleeve and thrust member in a bore axially disposed with respect to the longitudinal axis of a motor/gear drive shaft carrying a worm gear, which sleeve and thrust member minimize radial deflection and axial movement of the drive shaft thereby reducing noise and friction. The sleeve and thrust member are uniquely formed by injection molding in the motor/gearbox housing for a reduced motor/gearbox manufacturing cost while still providing long-term durability. The injection molding process steps of the present invention are integrated into the existing motor/gearbox assembly process to further reduce the cost of the motor/gearbox drive.

What is claimed is:

1. A method for manufacturing a motor/gear drive having a shaft with a worm gear carried thereon, and a free tip end portion with an outer diameter terminating in an end wall, and a housing having a bore formed coaxial with respect to the shaft to be installed therein, the method comprising the steps of:

inserting a mold core into the bore of the housing, the mold core having a first end portion with a diameter larger than the outer diameter of the free tip end portion of the shaft and a second larger diameter portion with a shoulder formed between the first and second portions sealingly closing a first portion of the bore in the housing, the first portion of the bore in the housing and the first end portion of the mold core forming an interior cavity therebetween;

injecting molten plastic into the interior cavity through a first gate to form a sleeve having an inner diameter surface surrounding a hollow bore; and removing the mold core.

2. The method of claim 1 further comprising the steps of:
forming a bearing mounting surface in the housing; and
forming the mold core with a surface engagable with the bearing surface in the housing to concentrically align the mold core and the first bore portion in the housing.

3. The method of claim 1 further comprising the steps of:
forming a first flange on the housing;
forming a second flange on the mold core; and
engaging the first and second flanges to align a longitudinal axis of the mold core with an axis extending through the first bore portion.

4. The method of claim 1 further comprising the steps of:
forming a second gate in the housing communicating with a second bore portion;
forming an end wall of the drive shaft with an outer diameter larger than the diameter of the second bore portion;
disposing the end wall of the drive shaft to sealingly close off an end of the second bore portion;
inserting the drive shaft of the motor/gear drive into the housing with the tip end portion of the drive shaft extending through the first bore portion;
disposing the end wall of the drive shaft to sealing close the second bore portion; and
injecting molten plastic through the second gate into the second bore portion to form a thrust member in the second bore portion in registry with the end wall of the drive shaft.

5. A method for manufacturing a motor/gear drive having a shaft with a worm gear carried thereon, and a free tip end portion with an outer diameter terminating in an end wall, a housing having a bore formed coaxial with respect to the shaft to be installed therein, the method comprising the steps of:

forming a gate in the housing communicating with one portion of the bore in the housing;

forming the end wall of the shaft with an outer diameter larger than the diameter of the one portion of the bore in the housing;

disposing the end wall of the shaft to sealingly close off an end of the one portion of the bore in the housing;

inserting the shaft into the housing with the free tip end portion of the shaft extending through another portion of the bore in the housing;

disposing the end wall of the shaft to sealing close the one portion of the bore in the housing; and injecting molten plastic through the gate into the one portion of the bore in the housing to form a thrust member in the one portion of the bore in the housing in registry with the end wall of the shaft.

6. A method for manufacturing a motor/gear drive having a shaft with a worm gear carried thereon, and a free tip end portion with an outer diameter terminating in an end wall, a housing having a bore formed coaxial with respect to the shaft to be installed therein, the method comprising the steps of:

forming the bore of the housing having a first bore portion of a first diameter; and injection molding a sleeve in the first bore portion, the sleeve having a through bore with an inner diameter larger than the outer diameter of a free tip end portion of the shaft.

7. A method for manufacturing a motor/gear drive having a shaft with a worm gear carried thereon, and a free tip end portion with an outer diameter terminating in an end wall, a housing having a bore formed coaxial with respect to the shaft to be installed therein, the method comprising the steps of:

providing a thrust-bearing-receiving bore of the housing for receiving an injection molded thrust bearing to engage with a limited area of the free tip end portion of a shaft, where the limited area of engagement between the thrust bearing and the free tip end of the shaft is less than an entire transverse area of the free tip end portion of the shaft; and injection molding the thrust member within the thrust-bearing-receiving bore of the housing in registry with the limited area of the tip end portion of the shaft, the thrust member limiting axial movement of the shaft.

8. In a method for manufacturing a motor/gear drive housing for enclosing a shaft supporting a worm gear for engagement with a pinion gear, the shaft having one end connectable to a prime mover and a free tip end portion with an outer diameter terminating in an end wall, the housing having an aperture formed coaxial with respect to the shaft to be installed therein, the improvement comprising the steps of:

separately plastic injection molding an annular sleeve and a thrust member within the aperture of the housing, wherein the plastic annular sleeve is position able to be coaxially sheathing an outer diameter of the shaft adjacent the free tip end portion of the shaft to be installed and to be nominally spaced radially from the outer diameter of the free tip end portion of the shaft to be installed, the sleeve operable to supportingly engage the outer diameter of the free tip end portion of the shaft only in response to radial loads acting to deflect the shaft into contact with the annular sleeve, and wherein the plastic thrust member is injection molded in coaxial registry with the end wall of the installed shaft, and operable with the end wall of the shaft to prevent axial movement of the shaft.

9. The improvement of claim 8 further comprising the steps of:
plastic injection molding both of the annular sleeve and the thrust member in situ within the aperture of the housing.

10. The improvement of claim 8 further comprising the step of:
installing the shaft within the aperture in the housing to define at least a portion of a chamber to receive injected plastic prior to injection molding the thrust member.

11. A motor/gear drive housing manufactured according to the method of claim 8 for enclosing a shaft supporting a worm gear for engagement with a pinion gear, the shaft having one end connectable to a prime mover and a free tip end portion with an outer diameter terminating in an end wall, the housing having an aperture formed coaxial with respect to the shaft to be installed therein, the improvement comprising:
a plastic injection molded annular sleeve and a separate plastic injection molded thrust member formed within the aperture of the housing, wherein the plastic annular sleeve is position able to be coaxially sheathing the outer diameter of the shaft adjacent the free tip end portion of the shaft to be installed and to be nominally spaced radially from the outer diameter of the free tip end portion, the sleeve operable to supportingly engage the outer diameter of the free tip end portion of the shaft only in response to radial loads acting to deflect the shaft into contact with the annular sleeve, and wherein the plastic thrust member is injection molded in coaxial registry with the end wall of the installed shaft, and operable with the end wall of the shaft to prevent axial movement of the shaft.

12. The improvement of claim 11 further comprising:
both of the plastic injection molded annular sleeve and the plastic injection molded thrust member formed in situ within the aperture of the housing.

13. The improvement of claim 11 wherein the sleeve is an injection molded sleeve formed in situ within the bore of the housing.

14. The improvement of claim 11 further comprising:
a plastic thrust member within the bore of the housing in coaxial registry with the end wall of the shaft to engage a limited portion of the end wall of the shaft corresponding to less than an entire transverse area of the end wall of the shaft, and operable with the end wall of the shaft to prevent axial movement of the shaft.

15. The improvement of claim 14 wherein the thrust member is an injection molded thrust member formed in situ within the bore of the housing.

16. The improvement of claim 15 further comprising:
the thrust member injection molded after installation of the shaft, wherein a portion of the end wall of the shaft defines at least a portion of a chamber to receive injected plastic forming the thrust member during injection molding.

17. The improvement of claim 11 further comprising:
the bore having a first portion of a first diameter and an axially endmost, coaxial, second portion of a smaller diameter, a shoulder formed between the first and second portions, and a first gate formed in the housing communicating with the first portion.

18. The improvement of claim 17 further comprising:
a second gate formed in the housing communicating with the second portion.

19. In a method for manufacturing a motor/gear drive housing for enclosing a shaft supporting a worm rear for engagement with a pinion gear, the shaft having one end connectible to a prime mover and a free tip end portion with an outer diameter terminating in an end wall, the housing having an aperture formed coaxial with respect to the shaft to be installed therein, the improvement comprising the steps of:
plastic injection molding at least one of an annular sleeve and a thrust member in situ within the aperture of the housing, wherein the plastic annular sleeve is positionable to be coaxially sheathing an outer diameter of the free tip end portion of the shaft to be installed and to be nominally spaced radially from the outer diameter of the free tip end portion of the shaft to be installed, the sleeve operable to supportingly engage the outer diameter of the free tip end portion of the shaft only in response to radial loads acting to deflect the shaft into contact with the annular sleeve, and wherein the plastic thrust member is positionable to be in coaxial registry with the end wall of the shaft, and operable to be engageable with the end wall of the shaft to prevent axial movement of the shaft; and
inserting a mold core into the aperture of the housing prior to injection molding the annular sleeve.

20. In a motor/gear drive housing for enclosing a shaft supporting a worm gear for engagement with a pinion gear, the shaft having one end connectible to a prime mover and a free tip end portion with an outer diameter terminating in an end wall, the housing having an aperture formed coaxial with respect to the shaft to be installed therein, the motor/gear drive housing manufactured by a method including the steps of plastic injection molding at least one of an annular sleeve and a thrust member in situ within the aperture of the housing, wherein the plastic annular sleeve is positionable to be coaxially sheathing an outer diameter of the free tip end portion of the shaft to be installed and to be nominally spaced radially from the outer diameter of the free tip end portion of the shaft to be installed, the sleeve operable to supportingly engage the outer diameter of the free tip end portion of the shaft only in response to radial loads acting to deflect the shaft into contact with the annular sleeve, and wherein the plastic thrust member is positionable to be in coaxial registry with the end wall of the shaft, and operable to be engageable with the end wall of the shaft to prevent axial movement of the shaft, the improvement comprising:
at least one of a plastic injection molded annular sleeve and a plastic injection molded thrust member formed in situ within the aperture of the housing, wherein the plastic annular sleeve is positionable to be coaxially sheathing the outer diameter of the free tip end portion of the shaft to be installed and to be nominally spaced radially from the outer diameter of the free tip end portion the sleeve operable to supportingly engage the outer diameter of the free tip end portion of the shaft only in response to radial loads acting to deflect the shaft into contact with the annular sleeve, and wherein the plastic thrust member is positionable to be in coaxial registry with the end wall of the shaft, and operable to be engageable with the end wall of the shaft to prevent axial movement of the shaft, and the sleeve having a bore extending therethrough, the bore having an inner diameter larger than the outer diameter of the tip end portion of the shaft to be installed.

21. In a motor/gear drive housing for enclosing a shaft supporting a worm gear for engagement with a pinion gear, the shaft having one end connectible to a prime mover and a free tip end portion with an outer diameter terminating in an end wall, the housing having an aperture formed coaxial with respect to the shaft to be installed therein, the motor/gear drive housing manufactured by a method including the steps of plastic injection molding at least one of an annular sleeve and a thrust member in situ within the aperture of the housing, wherein the plastic annular sleeve is positionable to be coaxially sheathing an outer diameter of the free tip end portion of the shaft to be installed and to be nominally spaced radially from the outer diameter of the free tip end portion of the shaft to be installed, the sleeve operable to supportingly engage the outer diameter of the free tip end portion of the shaft only in response to radial loads acting to deflect the shaft into contact with the annular sleeve, and wherein the plastic thrust member is positionable to be in coaxial registry with the end wall of the shaft, and operable to be engageable with the end wall of the shaft to prevent axial movement of the shaft, the improvement comprising:

at least one of a plastic injection molded annular sleeve and a plastic injection molded thrust member formed in situ within the aperture of the housing, wherein the plastic annular sleeve is positionable to be coaxially sheathing the outer diameter of the free tip end portion of the shaft to be installed and to be nominally spaced radially from the outer diameter of the free tip end portion, the sleeve operable to supportingly engage the outer diameter of the free tip end portion of the shaft only in response to radial loads acting to deflect the shaft into contact with the annular sleeve, and wherein the plastic thrust member is positionable to be in coaxial registry with the end wall of the shaft, and operable to be engageable with the end wall of the shaft to prevent axial movement of the shaft: and a plastic thrust member within the bore of the housing disposed to be in coaxial registry with the end wall of the shaft to be installed, and operable to be in engagement with the end wall of the shaft to be installed to prevent axial movement of the shaft, wherein the thrust member is an injection molded thrust member formed in situ within the bore of the housing, the outer diameter of the tip end portion of the shaft to be installed being larger than a diameter of the thrust member engageable with the end wall of the tip end portion of the shaft.

22. A method for manufacturing a motor/gear drive having a shaft with a worm gear comprising the steps of:

inserting a mold core into a coaxial bore of the housing wherein the core has a first end portion with a diameter larger than the outer diameter of the free tip end portion of the shaft and a second larger diameter portion with a shoulder formed between the first and second portions sealingly closing a first portion of the bore in the housing; and injection molding plastic into the cavity formed by the housing and core to form a sleeve having an inner diameter surface surrounding a hollow bore, and removing the core.

23. A method for manufacturing a motor/gear drive having a shaft with a worm gear comprising the steps of:

forming an end wall of a shaft with an outer diameter larger than a diameter of one portion of a bore in a housing;

disposing the end wall of the shaft to sealingly close off an end of the one portion of the bore in the housing; and injecting molten plastic through a gate into the one portion of the bore in the housing to form a thrust member in the one portion of the bore in the housing in registry with the end wall of the shaft.

24. A method for manufacturing a motor/gear drive having a shaft with a worm gear comprising the steps of:

providing a bore of a housing having a first bore portion of a first diameter; and injection molding a sleeve in the first bore portion, the sleeve having a through bore which is coaxial with respect to a shaft to be installed therein, the sleeve having an inner diameter larger than an outer diameter of a free tip end portion of the shaft.

* * * * *